(12) United States Patent
Latimer

(10) Patent No.: US 11,356,261 B2
(45) Date of Patent: Jun. 7, 2022

(54) APPARATUS AND METHODS FOR SECURE ACCESS TO REMOTE CONTENT

(71) Applicant: Sage (UK) Limited, Newcastle upon Tyne (GB)

(72) Inventor: Christopher Latimer, Whitley Bay (GB)

(73) Assignee: Sage (UK) Limited, Newcastle upon Tyne (GB)

( * ) Notice: Subject to any disclaimer, the term of this patent is extended or adjusted under 35 U.S.C. 154(b) by 206 days.

(21) Appl. No.: 16/826,897

(22) Filed: Mar. 23, 2020

(65) Prior Publication Data

US 2020/0322151 A1   Oct. 8, 2020

(30) Foreign Application Priority Data

Mar. 25, 2019   (GB) .................................... 1904111

(51) Int. Cl.
*H04L 29/06* (2006.01)
*H04L 9/32* (2006.01)
*H04L 9/08* (2006.01)
*H04L 9/40* (2022.01)

(52) U.S. Cl.
CPC .......... *H04L 9/3213* (2013.01); *H04L 9/0891* (2013.01); *H04L 9/0894* (2013.01); *H04L 9/3297* (2013.01); *H04L 63/10* (2013.01); *H04L 63/12* (2013.01)

(58) Field of Classification Search
None
See application file for complete search history.

(56) References Cited

U.S. PATENT DOCUMENTS 11,128,464 B1 *  9/2021  Loladia ................. H04L 9/3247
2001/0020228 A1   9/2001  Cantu et al.
2016/0308852 A1 * 10/2016  Coxe ...................... H04L 9/321
(Continued)

OTHER PUBLICATIONS

Combined Search and Examination Report for United Kingdom Application No. GB1904111.0 dated Sep. 13, 2019.
(Continued)

*Primary Examiner* — Andrew J Steinle
(74) *Attorney, Agent, or Firm* — Wolf, Greenfield & Sacks, P.C.

(57) ABSTRACT

System comprising an authorisation server; a client device communicably coupled to the authorisation server and configured to execute an application program; and a remote server communicably coupled to the client device for providing an application feature to the application program. The application program is configured to, in response to receiving a user request to use an application feature: access a first private key; and transmit an access request signed with the first private key to the authorisation server. The authorisation server is configured to issue a signed security token signed with a second private key to the application program in response to receiving the signed access request. The signed security token has a finite lifetime within which the application program can access the requested application feature using the signed security token. The application program is configured to access the application feature from the remote server using the signed security token.

18 Claims, 6 Drawing Sheets

(56) References Cited

U.S. PATENT DOCUMENTS

2017/0251367 A1\* 8/2017 Borovoy ................. G06F 21/33
2018/0145835 A1\* 5/2018 Barbour ................ H04L 9/3247

OTHER PUBLICATIONS

No Author Listed, Introduction to JSON Web Tokens. JWT IO. 2021;11 pages. https://jwt.io/introduction/ [Last accessed Nov. 29, 2021].
GB1904111.0, Sep. 13, 2019, Combination Search and Examination Report.

\* cited by examiner

APPARATUS AND METHODS FOR SECURE ACCESS TO REMOTE CONTENT

RELATED APPLICATIONS

Foreign priority benefits are claimed under 35 U.S.C. § 119(a)-(d) or 35 U.S.C. § 365(b) of British patent application number 1904111.0, filed Mar. 25, 2019.

BACKGROUND

Some software may be stored remotely from a client's device. If a user wishes to access some functionality or a service from web-based or remote software, the user is required to provide a username and password from their user device. These credentials will be provided to an authorisation entity which checks the provided details against a list of pre-registered users. If the details match an existing user who is allowed to use the requested software, the authorisation entity will allow the user device to use the requested functionality/service.

A user may find it tiresome to be required to enter a username and password each time they wish to access some functionality or service which is stored remotely from the user device. If the user forgets their username and/or password, they will need to reset it which requires time and effort (both user and computational), and there is a security risk of an unauthorised user obtaining the new login details during the resetting/re-requesting procedure. Further, there is a risk that a user's username and password may be compromised at any time (i.e. obtained by an unauthorised person), who may then obtain access to the remote software as if they are the authorised user, when they are actually unauthorised.

It is an object of embodiments of the invention to at least mitigate one or more of the problems of the prior art.

SUMMARY

In an aspect, there is provided a system comprising:
an authorisation server;
a client device communicably coupled to the authorisation server, the client device configured to execute thereon an application program; and
a remote server communicably coupled to the client device for providing an application feature to the application program; wherein:
the application program is configured to, in response to receiving a user request to use an application feature:
 access a first private key; and
 transmit an access request to the authorisation server, the access request signed with the first private key;
the authorisation server is configured to issue a signed security token to the application program in response to receiving the signed access request, wherein the signed security token is signed with a second private key available to the authorisation server, and wherein the signed security token has a finite lifetime within which the application program can access the requested application feature using the signed security token; and
the application program is configured to access the application feature provided by the remote server using the signed security token.

The application program may be configured to access the application feature provided by the remote server by:
the application program being configured to transmit a service use request with the signed security token to the remote server; and
the remote server being configured to grant the application program access to the requested application feature following verification of the signed security token by the remote server.

Verification of the signed security token may comprise one or more of: checking the signed security token is received at the remote server during the finite lifetime of the secure security token; checking the signed security token comprises a signature; and checking that the signed security token has been signed by the authorisation server using the authorisation server's public key.

The signed security token issued to the application program by the authorisation server may be one or more of: stored securely in-memory of the application program; and stored in a web browser session running in the application program.

The signed security token may comprise one or more claims indicating one or more of:
 the requesting user has authorised status to receive a signed security token;
 the requesting user is a member of an organisation which has authorised status to receive a signed security token;
 the identity of the application program;
 the identity of the authorisation server issuing the signed security token;
 the IP address of the client device;
 an expiration time of the signed security token;
 a timeframe within which the signed security token may be used to access an application feature provided by the remote server and outside which the signed security token may not be used to access an application feature provided by the remote server;
 a timestamp indicating the time of issuance of the signed security token by the authorisation server;
 a signed security token signature which can be validated against the public key of the authorisation server; and
 a unique identifier of the signed security token.

The second private key may be available only to the authorisation server. The second private key may be cryptographically and uniquely paired with an associated public key made available to the remote server. The application program may not have access to the second private key.

The first private key may be retrieved from the authorisation server prior to the application program receiving a user request to use an application feature.

The application program may be configured to, in response to receiving a timeout indication indicating an expiry time of the signed security token:
 re-access the first private key, and
 transmit a further access request signed with the first private key to the authorisation server requesting re-issuance of a signed security token to the application program.

The authorisation server may be configured to periodically transmit a new first private key for storage at a secure storage repository; and following transmission of a new first private key, the authorisation server is configured to:
 prevent issue of a signed security token to the application program in response to receiving a signed access request signed with an old first private key; wherein an old first private key is any first private key transmitted before transmission of the new first private key, and
 issue a signed security token to the application program in response to receiving a signed access request signed with the new first private key.

The application program may be configured to, after receipt of the signed security token, store the signed security token in a secure repository. The secure repository may be, for example, cloud-based storage or a remote server.

The system may comprise a further client device communicably coupled to the secure repository, the secure repository configured to:
  provide the signed security token to the further client device following synchronisation of the further client device with the signed security token stored in the secure repository, thereby allowing the further client device to access the application feature provided by the remote server using the signed security token.

Synchronisation of the further client device with the signed security token may comprise synchronisation of the client device and further client device by secure pattern implementation using a central server. This allows the client device to publish data securely to be used by the further client device with which it is synchronised. The further client device may be said to be "subscribed" to the published data from the client device.

The first private key may be stored at a secure storage repository communicably coupled to the client device. The application program may be configured to access the first private key from the secure storage repository.

The application program may be configured to transmit an application program registration request to the authorisation server; the authorisation server may be configured to verify the application program registration request as a valid request; and transmit a registration security token to the application program in response to verification of the valid application program registration request; the application program may be configured to transmit the received registration security token with an authorised application program registration request to register the application program with the authorisation server to the authorisation server; and the authorisation server may be configured to transmit the first private key for secure storage at the secure storage repository in response to receipt of the registration security token and the authorised application program request from the application program.

The application program registration request may comprise one or more of:
  a unique user identifier indicating the user is authorised to use the application program to subsequently obtain the application feature; and
  a unique application program identifier indicating the application program to be used to subsequently obtain the application feature.

The application program may comprise one or more local application features available at the client device. The application program may be configured to, in response to receiving a user request to use a local application feature, provide the local application feature to the user from the client device.

One or more of the authorisation server and the remote server may be comprised in a computing cloud.

The security token may be a JavaScript Object Notation Web Token. One or more of the first private key and the second private key may be an Application Programming Interface key.

The client device may be one or more of: a desktop computer, a laptop computer, a tablet computer, a portable electronic device, a mobile telephone, a smartwatch, a computing device in a vehicle, or a module for the same.

In an aspect, there is provided a client device configured to execute an application program, the application program configured to, in response to receiving a user request for access to an application feature provided by a remote server:
  access a first private key;
  transmit an access request to an authorisation server, the access request signed with the first private key;
  receive a signed security token issued to the client device by the authorisation server in response to receipt of the signed access request by the authorisation server, wherein the signed security token is signed with a second private key available to the authorisation server, and wherein the signed security token has a finite lifetime within which the application program can access the requested application feature using the signed security token; and
  access the application feature provided by the remote server using the received signed security token.

In an aspect, there is provided a computer-implemented method comprising:
  accessing, by an application program executed on a client device, a first private key in response to receiving a user request for access to an application feature provided by a remote server;
  transmitting, by the application program, an access request to an authorisation server, the access request signed with the first private key;
  receiving, by the application program, a signed security token issued to the client device by the authorisation server in response to receiving the signed access request, wherein the signed security token is signed with a second private key available to the authorisation server, and wherein the signed security token has a finite lifetime within which the application program can access the requested application feature using the signed security token; and
  accessing, by the application program, the application feature provided by the remote server using the received signed security token.

In an aspect, there is provided a computer readable medium comprising computer program code which, when executed, is configured to perform:
  accessing, by an application program executed on a client device, a first private key in response to receiving a user request for access to an application feature provided by a remote server;
  transmitting an access request to an authorisation server, the access request signed with the first private key;
  receiving a signed security token issued to the client device by the authorisation server in response to receipt of the signed access request, wherein the signed security token is signed with a second private key available to the authorisation server, and wherein the signed security token has a finite lifetime within which the application program can access the requested application feature using the signed security token; and
  accessing the application feature provided by the remote server using the received signed security token.

In an aspect, there is provided an authorisation server configured to:
  receive an access request for access to an application feature provided by a remote server, from an application program running on a client device, wherein the application program transmitted the access request in response to receiving a user request for access to the application feature, the access request signed with a first private key; and
  transmit a signed security token to the client device in response to receipt of the signed access request, wherein the signed security token is signed with a second private key available to the authorisation server, and wherein the signed security token has a finite lifetime within which the application program can access the requested application feature using the signed security token; the signed security token for use by the client device to access the application feature provided by the remote server.

The authorisation server may be configured to: prior to receiving the access request for access to the application feature provided by the remote server, and in response to receiving a valid private key request from a client device, transmit the first private key to the client device.

In an aspect, there is provided a computer-implemented method comprising:
  receiving, at an authorisation server, an access request for access to an application feature provided by a remote server, from an application program running on a client device, wherein the application program transmitted the access request in response to receiving a user request for access to the application feature, the access request signed with a first private key; and
  transmitting, by the authorisation server, a signed security token to the client device in response to receipt of the signed access request, wherein the signed security token is signed with a second private key available to the authorisation server, and wherein the signed security token has a finite lifetime within which the application program can access the requested application feature using the signed security token; the signed security token for use by the client device to access the application feature provided by the remote server.

The method may further comprise: prior to receiving the access request for access to the application feature provided by the remote server, transmitting the first private key to the client device in response to receiving a valid private key request from a client device.

In an aspect, there is provided a computer readable medium comprising computer program code which, when executed, is configured to perform:
  receiving, at an authorisation server, an access request for access to an application feature provided by a remote server, from an application program running on a client device, wherein the application program transmitted the access request in response to receiving a user request for access to the application feature, the access request signed with a first private key; and
  transmitting, by the authorisation server, a signed security token to the client device in response to receipt of the signed access request, wherein the signed security token is signed with a second private key available to the authorisation server, and wherein the signed security token has a finite lifetime within which the application program can access the requested application feature using the signed security token; the signed security token for use by the client device to access the application feature provided by the remote server.

In an aspect, there is provided computer program code which, when executed by a computer, is arranged to perform any method claimed herein. Any computer program code described herein may be stored on a non-transitory computer-readable medium. Any computer program code described herein may be a sub-program configured to operate with one or more further computer programs.

In an aspect there is provided a computer comprising any system described herein, arranged to perform any method described herein, or arranged to execute any computer program code described herein.

In an aspect, there is provided a computer, comprising one or more processing devices arranged to, in use, execute computer readable instructions to implement an application program, wherein the application program is arranged to perform any application program method described herein.

In an aspect, there is provided a computer, comprising one or more processing devices arranged to, in use, execute computer readable instructions to implement an authorisation program, wherein the authorisation program is arranged to perform any authorisation method described herein.

In an aspect there is provided a data processing system or computer program product for use in any system described herein.

In an aspect there is provided a computer system comprising:
  a server computer comprising any authorisation server and remote server described herein; and
  a client computer communicably coupled to the server computer by a computer network. The client computer is configured to execute a client computer application program to communicate the access request to the server computer and receive the signed security token from the authorisation server. The client computer is configured to execute the client computer application program to communicate the signed security token to the server computer and receive the requested application feature from the remote sever. The access request may be communicated to the server computer from the client computer in response to a user input received by the client computer. The server computer may be partially or wholly available in a computing cloud.

The term "computer" may be understood to encompass a single computing entity/device or a distributed computer system comprising a plurality of computing entities/devices which may be located at substantially the same geographic location, or at substantially different geographical locations. One or more computing entities/devices in a distributed system may be located in the "computing cloud".

BRIEF DESCRIPTION OF THE DRAWINGS

Embodiments of the invention will now be described by way of example only, with reference to the accompanying figures, in which.

DETAILED DESCRIPTION

Some software may be stored remotely from a client's device. If a user wishes to access some functionality or a service from web-based or remote software, the user may need to provide their credentials, such as a username and password, from their user device. These credentials may be provided to an authorisation entity which checks the provided details against a list of pre-registered users. If the details match an existing user who is allowed to use the requested software, the authorisation entity allows the user to access the requested remote functionality. For example, the authorisation entity may provide the user device with an electronic token, which can in turn be provided to the remote entity providing the requested functionality or service to prove the user is allowed to use the requested functionality/service. The user may then use the requested functionality or service.

However, a user may find it tiresome to be required to enter a username and password each time they wish to access some functionality or service which is stored remotely from the user device, or each time there is an update to the remotely stored software. There also exists a security risk that an unauthorised person may obtain (steal) a user's username and password, either by tracking the user's keystrokes, intercepting a user request for a username or password reminder, running a brute force program to guess the user's details, or even stealing a note (electronic or physical) in which the username and password are recorded.

Examples disclosed herein may provide an improved system and method for allowing a user to access remotely stored software features in a secure way which the user finds less burdensome than manually and repeatedly entering user authorisation credentials. Examples disclosed herein may allow for a user of a client application, such as a desktop application or cloud-based web application, to access remote web services without being required to sign in using a username and password each time access is desired.

In some examples, instead of requiring a user to create an account or identity, a machine-based authorisation flow is performed during product "on-boarding" to a remote (e.g. cloud) service (i.e. during an initial setup of a desktop/client device-based software package to allow access to remotely stored software content). This may also be termed "feature activation" of software features stored remote from the desktop/client device.

By using a machine-based authorisation rather than relying on the manual entry of security credentials from a user, trust is seamlessly and transparently established between the unique application which the user is using, and the remote service.

Figure 1:
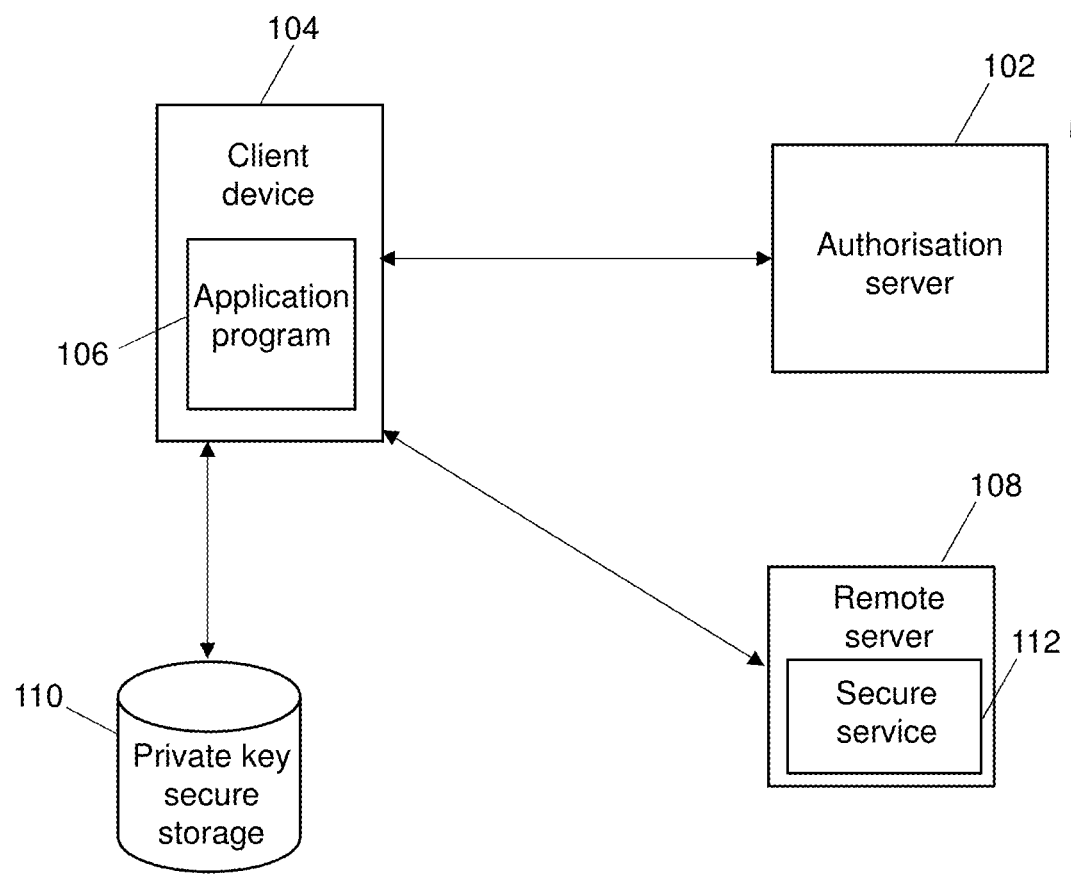
FIG. 1 shows a system according to an embodiment of the invention.

FIG. 1 shows a system according to an embodiment of the invention. The system 100 comprises a client device 104 on which an application program 106 is installed. The client device 104 may be, for example, a desktop computer, a laptop computer, a tablet computer, a portable electronic device, a mobile telephone, a smartwatch, a computing device in a vehicle (e.g. as an integral/embedded part of a vehicle, such as a motor vehicle, a land vehicle, a car, a van, a motorbike, etc), or a module for the same. The client device 104 is configured to execute thereon the application program 106. In some examples such as that discussed below, the application program may be a "desktop" product (i.e. installed and running on the client device). In some examples, the application program may be a cloud-based web application accessed through a client device (i.e the examples discussed below in relation to a desktop based product apply to a cloud-based web application as well). That is, the phrase "the client device configured to execute thereon an application program" should be understood to encompass the examples of an application program installed on the client device as well as an application program being a remote (e.g. cloud-based) web application which is accessible by a client device, so that a user could use the application program as if it was installed and running on the client device.

The client device 104 is also communicably coupled to a remote server 108. The remote server 108 can provide an application feature/service 112 to the application program 106 on the client device 104. Such an application feature/service 112 may be called a remote application feature because it is stored remotely from the client device 104.

The application program 106 on the client device 104 may itself comprise one or more local application features available at the client device 104. Such an application program 106 may be configured to, in response to receiving a user request to use a local application feature, provide the local application feature to the user from the client device 104.

The client device 104 can also communicate with a remote storage 110 which can securely store one or more private keys (e.g. Application Programming Interface keys). The client device 104 is also communicably coupled to an authorisation server 102. One or more of the authorisation server 102 and the remote server 108 may be comprised in a computing cloud.

The system of FIG. 1 is configured such that the application program 106 is configured to, in response to receiving a user request to use an application feature 112: access a first private key; and transmit an access request to the authorisation server 102, the access request signed with the first private key. The authorisation server 102 is configured to issue a signed security token to the application program 106 in response to receiving the signed access request, wherein the signed security token is signed with a second private key available to the authorisation server 106, and wherein the signed security token has a finite lifetime within which the application program 106 can access the requested application feature 112 using the signed security token. The application program 106 is configured to access the application feature 112 provided by the remote server 108 using the signed security token. This is discussed in more detail in relation to FIG. 3.

Figure 2:
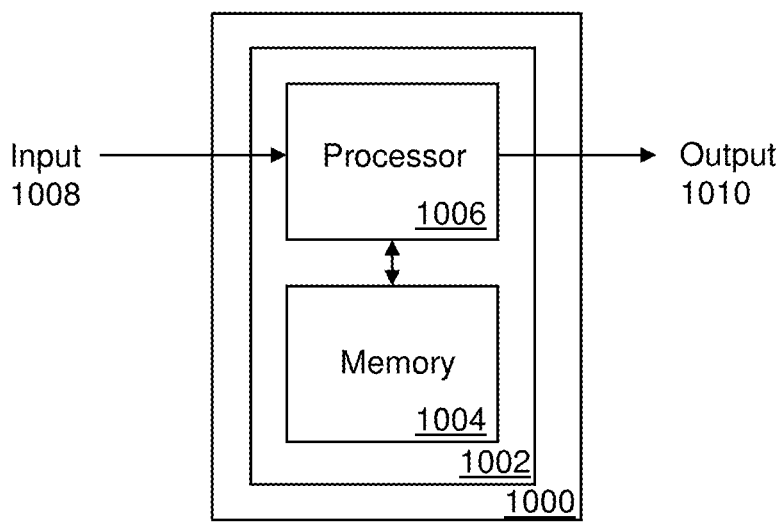
FIG. 2 shows a computer according to an embodiment of the invention.

FIG. 2 shows a computer 1000 according to an embodiment of the invention. The computer 1000 may be the system 100, or may form a part of the system 100, such as the client device 104, authorisation server 102, or remote server 108 (i.e. the system 100 of FIG. 1 may comprise more than one computer 1000). The computer 1000 may comprise one or more processing units 1002 (one is shown in FIG. 2). Each processing unit comprises a memory 1004 and processor 1006. The computer 1000 may comprise one or more processors 1006 arranged to operably execute computer software/computer program code thereon, where the computer software/computer program code is stored in a computer-readable medium accessible to the one or more processors 1006. The computer-readable medium may be one or more memory devices, where the memory may also store data for use by the software/program code (e.g. memory 1004 or a separate memory store external to the computer 1000). It will be appreciated that the memory 1004 in which, for example, a signed security token or private key may be stored, may in some examples be part of a physically distinct computer system than the one or more computers implementing the processing, such as accessing a private key, transmitting an access request, or accessing an application feature from a remote server. In other examples such a memory may be a part of a computer 1000, such as a client computing device.

The computer 1000 can receive data (e.g. a user request to access an application feature) as input 1008 and can provide data (e.g. authorisation to use the requested application feature) as output 1010.

It will be appreciated that the one or more processors 1006 do not necessarily need to be formed as part of the same physical server computer 1000 and that at least a portion of the processors 1006 may form a virtual machine implementing the system 100 i.e. as a cloud computer. Embodiments may be implemented by a plurality of distributed computers 1000, with each of the computers 1000 performing one or more processing steps.

Figure 3:
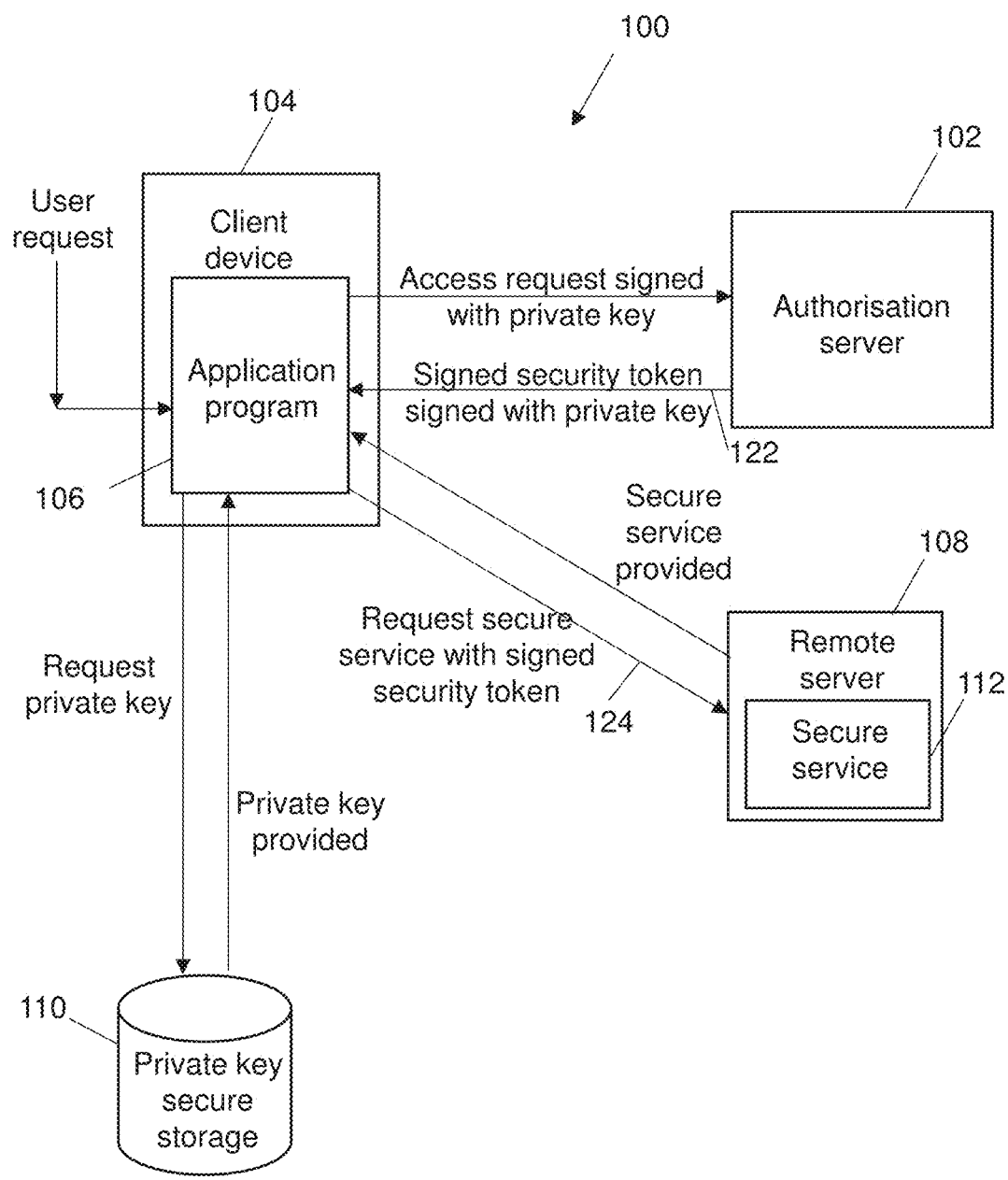
FIG. 3 shows a system and data flow according to an embodiment of the invention.

FIG. 3 shows a system 100 according to an embodiment of the invention. FIG. 3 shows the system 100 of FIG. 1, and also indicates a data flow between the computing entities in the system 100.

The application program 106 stored at the client device 104 is configured to receive a user request 114 to use an application feature 112. The application feature 112 in this example is not locally stored in the application program 106 at the client device 104, but is stored remotely at a remote server 108. The remote server 108 may be a physical computer server, may be an Internet-based computing entity, or may be a cloud computing entity. An example of a remotely stored application program feature may be: a cloud-based web application located in the cloud, accessible using a client device; an add-on software package for a "vanilla" or basic desktop-based software package, such as an additional operation package providing additional software functionality to that available at only the desktop-based application program 106; an additional language pack; a software update; a "secure" feature requiring authentication prior to use, such as a feature involving private and/or sensitive information relating to individuals, organisations, payments or banking for example; or an affiliated software package associated with the desktop based application program 106, for example.

In response to receiving the user request 114, the application program 106 accesses a first private key. This may be achieved by the application program 106 sending a request for a first private key 116 to a private key secure storage 110. The secure storage 100 may in some examples be a part of the client device 104, and in some examples may be remote from the client device 104. The private key secure storage 110 provides the requested first private key 118 to the application program 106 to use. In other words, the first private key may be stored at a secure storage repository 110 communicably coupled to the client device 104, and the application program 106 may be configured to access the first private key from the secure storage repository 110. The first private key may be provided to the client device 104 by the authorisation service 102 during an on-boarding process (discussed in relation to FIG. 4), and proves that the application program 106 is the registered program which is authorised to access application features 112 from the remote server 108.

The application program 106 then transmits an access request 120 to the authorisation server 102. The access request is signed with the first private key. The first private key may be an Application Programming Interface key (API key). An API is a software intermediary that allows two applications to talk to each other.

Any time the user wishes to navigate to a remotely-hosted application feature 112 from within their desktop product 106, the desktop application 106 will retrieve their first private key 118 and make a 'signed' request 120 to the authorisation server/API endpoint 102 on the user's behalf. The user therefore does not need to enter their authorisation credentials (e.g. username and password) each time a remotely stored application feature is requested because the first private key has been obtained and is available for use by the application program 106 to prove the program is authorised to access the requested feature 112.

The authorisation server 102 receives the access request 120 which is signed with the first private key, and verifies that it has been validly signed with the first private key. If verified, the authorisation server 102 is configured to issue a signed security token 122 to the application program 106 in response. The signed security token may be stored client-side (e.g. in a secure repository or in a browser cookie at the client device).

The signed security token 122 is signed with a second private key available to the authorisation server 106. The second private key may also be an Application Programming Interface key (API key) in some examples. The second private key may be available only to the authorisation server, but be uniquely and cryptographically paired to an associated public key which is made available to the remote server. This public key can be used to definitively verify that a signature contained within a security token could only have been generated by the owner of the secret private key (i.e. the trusted authorisation server).

The signed security token 122 has a finite lifetime (e.g. 20 minutes, a typical average time for a user session following user log-in) within which the application program 106 can access the requested application feature 112 using the signed security token 122. The signed security token 122 may be a JavaScript Object Notation Web Token (JSON web token or JWT) in some examples. The signed security token is used by the application program 106 to make authenticated (e.g. web) requests for application features 112, such as UI content and/or API calls, from the remote server 108. The remote server 108 may be stored on a computer cloud, and in such examples the user maybe considered to be accessing cloud-based features or services.

The signed security token 122 may comprise one or more "claims" which provide some information about the requesting user and/or one or more conditions of the issued security token. For example, the claims may note that the issued security token may only be used by the requesting user, or may be used by other users who are part of a trusted group including the requesting user. For example, the claims may specify that the issued token is valid for a finite predetermined time period from issuance (e.g. 20 minutes, 12 hours, or another time period), after which it is expired and may not be used to access the remote secure service 112.

The claims may indicate one or more of: the requesting user has authorised status to receive a signed security token; the requesting user is a member of an organisation which has authorised status to receive a signed security token; the requesting user is a representative of a specific company within an authorised member organisation; the identity of the application program 106 from which the request for access to the remote secure service 112 has been made; the identity of the authorisation server 102 issuing the signed security token; the IP address of the client device 104; an expiration time of the signed security token; a timeframe within which the signed security token may be used to access an application feature 112 provided by the remote server 108 and outside which the signed security token may not be used to access an application feature 112 provided by the remote server 108; a timestamp indicating the time of issuance of the signed security token by the authorisation server 102; a signed security token signature which can be validated against the public key of the authorisation server 102; and a unique identifier of the signed security token.

A signed security token signature may be validated against the public key of the authorisation server 102. The authorisation server 102 may use a secret private key to sign the security token via a complex cryptography algorithm. The remote server has access to the authorisation server's public key (which is exactly and uniquely paired with the private key), and which can be used in conjunction with the same cryptographic algorithm to definitively verify that the security token signature could only have been generated by the owner of the secret private key.

The signed security token 122 issued to the application program 106 by the authorisation server 102 may in some examples be stored securely in-memory of the application program (e.g. while the application program is running), and/or in a web browser session running in the application program 106 (e.g. in a cookie). Storage of the signed security token 122 in-memory of the application program may support API requests, whereas storage in a web browser session may support UI request calls.

The application program 106 is configured to access the application feature 112 provided by the remote server 108 using the signed security token 122.

For example, the application program 106 may send a request for access to a secure service from the remote sever 108 along with the signed security token 124 to prove that the application program 106 is authorised to access the application feature 112. The remote server 108 then allows the application program 106 to access the requested secure service 112, for example after verifying that the provided signed security token 124 is valid (e.g. not time-expired). In other words, the application program 106 is configured to access the application feature 112 provided by the remote server 108 by transmitting a service use request 124 with the signed security token to the remote server 108. The remote server 108 then grants 126 the application program 106 access to the requested application feature 112 following verification of the signed security token by the remote server 108.

In some examples, the application program 106 may receive a timeout indication indicating an expiry time of the signed security token. For example, the signed security token may be valid for 30 minutes following issue, after which it is no longer valid for use in accessing the application feature 112. Thus the application may, in response to receiving such a timeout, re-access the first private key (for example, by sending a re-request for the first private key to the authorisation server 102 or by accessing the first private key from a secure storage location such as storage 110). The application program 106 may then transmit a further access request signed with the first private key to the authorisation server 102 requesting re-issuance of a signed security token to the application program 106. The re-issued signed security token will again be signed by the second private key which is only accessible to the authorisation server. Note that the client application program does not have access to the second private key. By requiring a re-request for a signed security token following time-expiry of a previously issued signed security token, access to remote application features may be more secure because regular re-verification takes place (although this does not require manual user intervention or credential supply because the re-requesting and re-issuance of a signed security token takes place between the application program and the authorisation server).

In some examples, the authorisation server 106 is configured to periodically transmit a new first private key (e.g. daily) for storage at a secure storage repository 110. This may improve security by refreshing the first private key which is required for the application program 106 to receive a signed security token from the authorisation server 102. Following transmission of a new first private key, the authorisation server 102 is configured to prevent issue of a signed security token to the application program 106 in response to receiving a signed access request signed with an old first private key. An old first private key is any first private key transmitted before transmission of the new first private key. The authorisation server 102 is configured to issue a signed security token 122 to the application program 106 in response to receiving a signed access request 120 signed with the new first private key.

In some examples, the application program 106 may be configured to, after receipt of the signed security token 122, store the signed security token in, a web browser (e.g. as a cookie), or securely in-memory of the application program 106. This allows the application program 106 of the client device 104, or in some examples the application program of another client device, to look up the signed security token and use it to access a remote application feature. This is discussed more in relation to FIG. 5.

The signed security token is thus used to authenticate the application program 106, for example a secure online web application, enabling the user to seamlessly navigate private and secure remote content and services (e.g. cloud-hosted webpages or API calls related to private or sensitive information such as a personal, payment or banking data) within their application program 106, without having to create an identity or login to anything each time. This increases security, as the secure remote content (e.g. online webpages) are only accessible to somebody using their exact desktop instance as defined in a one-off on-boarding process (see FIG. 4), and does require any vulnerable username/password credentials to be protected by the user.

In summary, the client device 104 is configured to execute an application program 106, the application program 106 configured to, in response to receiving a user request 114 for access to an application feature 112 provided by a remote server 108: access a first private key 116, 118; transmit an access request 120 to an authorisation server 102, the access request signed with the first private key; receive a signed security token 122 issued to the client device 104 by the authorisation server 102 in response to receipt of the signed access request by the authorisation server, wherein the signed security token is signed with a second private key available to the authorisation server 102, and wherein the signed security token has a finite lifetime within which the application program 106 can access the requested application feature 112 using the signed security token; and access the application feature provided by the remote server 108 using the received signed security token.

In summary, the authorisation server 102 is configured to: receive an access request 120 for access to an application feature 112 provided by a remote server 108, from an application program 106 running on a client device 104, wherein the application program 106 transmitted the access request 120 in response to receiving a user request 114 for access to the application feature 112, the access request signed with a first private key; and transmit a signed security token 122 to the client device 104 in response to receipt of the signed access request, wherein the signed security token is signed with a second private key available to the authorisation server 106, and wherein the signed security token has a finite lifetime within which the application program 106 can access the requested application feature 112 using the signed security token; the signed security token for use by the client device 104 to access the application feature 112 provided by the remote server 108.

In some examples, the authorisation server 102 is further configured to, prior to receiving the access request 120 for access to the application feature 112 provided by the remote server 108, and in response to receiving a valid private key request from a client device, transmit the first private key to the client device 104. The first private key may then be used by the application program 106 to sign the access request 120 for access to the application feature 112, so the authorisation server can check, by virtue of the first private key signature, that the access request 120 is sent by an authorised user of the application program 106.

Figure 4:
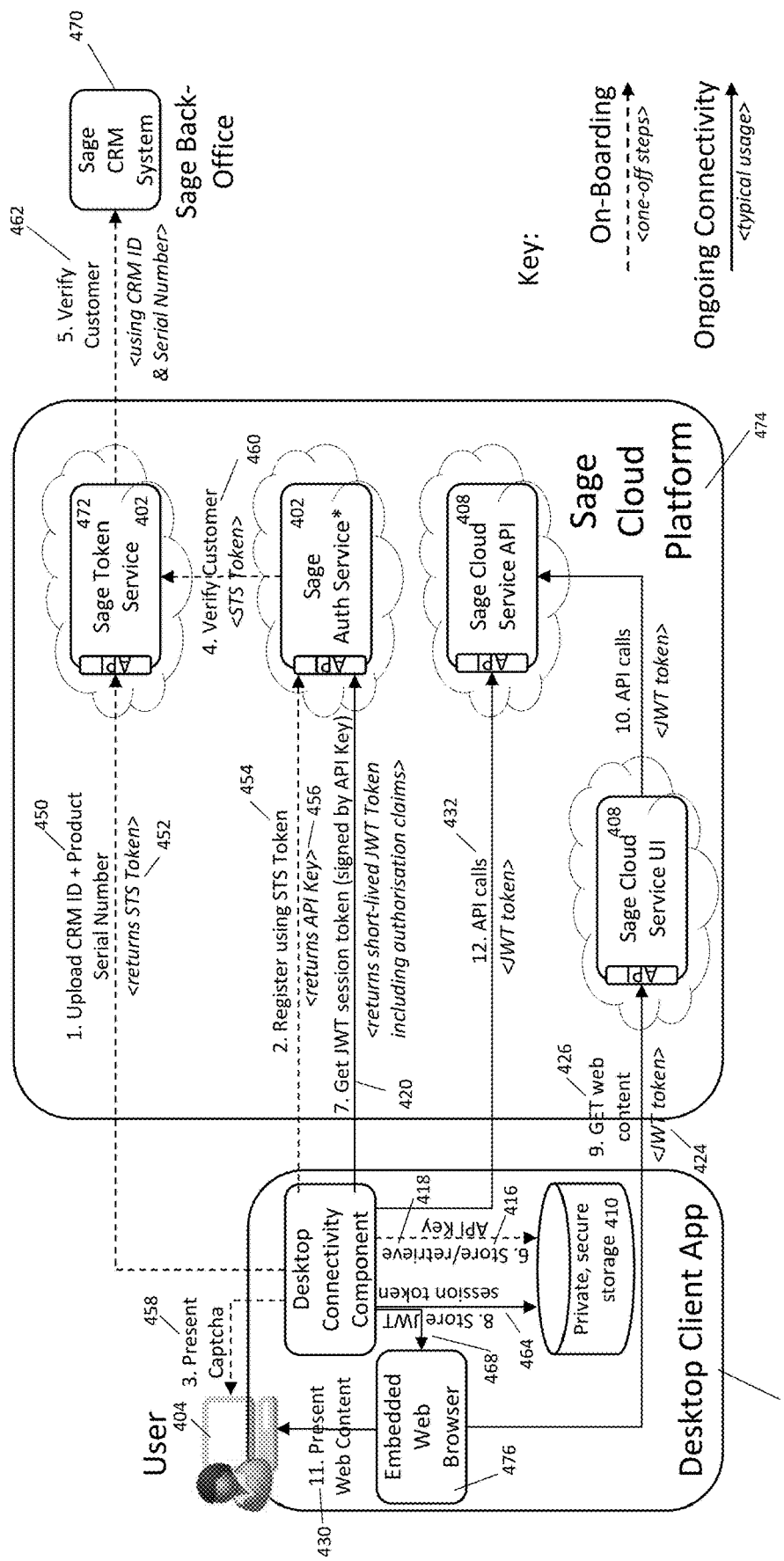
FIG. 4 shows an example system with data flow according to an embodiment of the invention.

FIG. 4 shows an example system according to an embodiment of the invention. Elements shown in FIGS. 1 and 3 (e.g. 102, 104) which are also shown in FIG. 4 have similar reference numerals (e.g. 402, 404) and will not be discussed in detail again. FIG. 4 shows the initial "on-boarding" steps as dashed lines between computer elements, and "on-going connectivity" steps as solid lines, as discussed in relation to FIG. 3. On-boarding steps are the initial establishment of a trusted connection between the user's application program (the Desktop Client App 406 in this example).

In FIG. 4, the system 400 comprises an authorisation server 402 (Sage Auth Service), and a client device 404 communicably coupled to the authorisation server 402 (in this example via the Desktop Connectivity Component of the Desktop Client App 406). The client device is configured to execute thereon an application program (Desktop Client App 406). The system 400 also comprises a remote server 408 (in this example split into a Sage Cloud Service UI (User Interface) and Sage Cloud Service API in the Sage Cloud Platform 474). The remote server elements 408 are communicably coupled to the client device 404 (via the Desktop Client App 406) for providing an application feature/service to the application program 406.

In the initial on-boarding procedure, the Desktop Client App 406 is registered with the authorisation server 402. Once this procedure has been completed successfully, future requests by the user for remote content/application features stored at the remote server 408 can be handled transparently between the application program 406 and the authorisation server 402 without requiring user intervention such as entry of a username and password.

In the system of FIG. 4, the application program 406 is configured to transmit an application program registration request 450 to the authorisation server 402. This is shown as "Step 1. Upload CRM ID (Customer Relationship Management Identifier) and Product Serial Number". The CRM ID uniquely identifies the application user and the real-world organisation they are associated with. The Product Serial Number uniquely identifies the application program 406 and therefore enables a license verification step within the authorisation server.

The authorisation server 402 is configured to verify the application program registration request 450 as a valid request and transmit a registration security token 452 to the application program 406 in response to verification of the valid application program registration request 450. The transmission of a registration security token 452 is shown in FIG. 4 as "Step 1. <returns STS token>", where the STS token (Security Token Service token) indicates that the uploaded CRM ID and Product Serial Number 450 have been submitted to the Sage Token Service 472 of the authorisation server 402. Thus the application program registration request 450 may comprise one or more of a unique user identifier (e.g. CRM ID) indicating the user is authorised to use the application program 406 to subsequently obtain the application feature; and a unique application program identifier (e.g. Product Serial Number) indicating the application program 406 to be used to subsequently obtain the application feature. In some examples the Token Service 472 and the Authorisation Service 402 are the same authorisation server entity; in FIG. 4 they are shown separate and communicably linked.

The application program 406 is then configured to transmit the received registration security token 454, with an authorised application program registration request to register the application program 406 with the authorisation server 402, to the authorisation server 402. This is shown in FIG. 4 as "Step 2. Register using STS Token" 454.

The authorisation server 402 is configured to transmit the first private key 456, e.g. for secure storage at the secure storage repository 410, in response to receipt of the registration security token 454 and the authorised application program request from the application program 406. This is shown in FIG. 4 as "Step 2. <returns API key>" 456.

FIG. 4 also shows the step of verifying that a real user is situated at the client device 404 by sending a Captcha 458 for the user to interact with (shown in "Step 3. Present Captcha"). A Captcha is a computer program or system intended to distinguish human from machine input, for example by requesting entry of a series of letters presented to the user in a distorted way. Any suitable Captcha system may be used as known in the art. The Captcha step is only applicable to desktop application clients. In examples in which the client represents a trusted web application instead, this Captcha step can be bypassed.

FIG. 4 also shows the steps of verifying the user and application program credentials in the on-boarding stage. "Step 4. Verify Customer <STS Token>" 460 shows that the STS token issued to the application program 406 is provided to the authorisation service 402 to prove the user has attempted to obtain authorisation. In "Step 5. Verify Customer <using CRM ID and Serial Number>" 462 the STS token issued to the application program 406 is provided from the Sage Token Service 472 of the authorisation server 402 to a Sage CRM system 470 at the Sage Back-Office, which contains a database or log of all registered customers against which the provided user and product IDs can be checked.

Following the initial on-boarding steps to verify the user and application program 406, future requests for use of a remote feature may be performed without the requirement for the user to provide any user ID or product ID information.

In ongoing use (after the on-boarding steps), the application program 406 is configured to, in response to receiving a user request to use an application feature, access a first private key. This is shown in FIG. 4 as "Step 6. Store/retrieve API key" 416, 148 where the Desktop Connectivity Component obtains the first private key from the Private Secure Storage 410. That is, a first private key, such as a unique API signing key, is assigned to the desktop application program 406. The first private key in this example is distributed to each desktop product instance 406 following the robust "on-boarding" process. The first private key may be stored by the desktop application program 406 in an obscure and secure location accessible only to desktop machine administrator users.

In this example the Private Secure Storage 410 is shown as part of the Desktop Client App but in other examples it may be external from the Desktop Client App, or even remote from the client device 404. The application program 406 is also configured to transmit an access request to the authorisation server 420, wherein the access request is signed with the first private key. This is shown in FIG. 4 as "Step 7. Get JWT session token (signed by API key)" 420, wherein the request for access is a request for an authorisation token, here a JSON Web Token (JWT), to use to access the application feature from the remote application 408.

The authorisation server 402 is configured to issue a signed security token 422 to the application program 406 in response to receiving the signed access request 420. This is shown in FIG. 4 as "Step 7. Get JWT session token (signed by API key)". The signed security token is signed with a second private key (e.g. an API key) available to the authorisation server 402. The signed security token has a finite lifetime within which the application program 406 can access the requested application feature using the signed security token.

In some examples as shown in FIG. 4, the requested signed security token (JWT session token) may be stored securely in-memory 464 of the application program 406 once issued to the application program 406. Alternatively, or additionally, in some examples as shown in FIG. 4, the requested signed security token (JWT session token) may be stored 468 in an Embedded Web Browser 476 (e.g. as a cookie) once issued to the application program 406. These examples are shown in FIG. 4 as "Step 8. Store JWT session token" 464, 468. The typically short-lived security token may be transiently stored, for example, in the running application memory (to support API requests) and in a web browser cookie (to support UI requests). The security token may not be persisted to disk.

The application program 406 is then configured to access the application feature provided by the remote server 408 using the signed security token 424. This is shown in FIG. 4 as "Step 9. GET web content <JWT token>" 426, wherein the web content is the requested application feature. The Desktop Client App, in this example via the Embedded Web Browser 476, sends the JWT token 424 to the Sage Cloud Service UI 408 of the remote server 408, which provides the requested application feature/web content.

The Sage Cloud Service UI 408 also performs "Step 10. API calls <JWT token>" 428 to communicate from the UI 408 to the Sage Cloud Service API 408 which makes API calls using the JWT token 432 to the Desktop Connectivity Component of the Desktop Client App 406 to manage the communication between the Desktop Connectivity Component of the Desktop Client App 406 and the Sage Cloud Service UI/application feature 408. The API calls are messages which pass between the application program 406 and the remote application feature 408.

After a successful request for remote application content is made using the signed security token 424, the application program 406 receives the requested application feature 426 which is presented to the user of the client device 404, in this example via an Embedded Web Browser 476 which performs "Step 11. Present Web Content"—the Web Content presented is the requested application feature.

Figure 5:
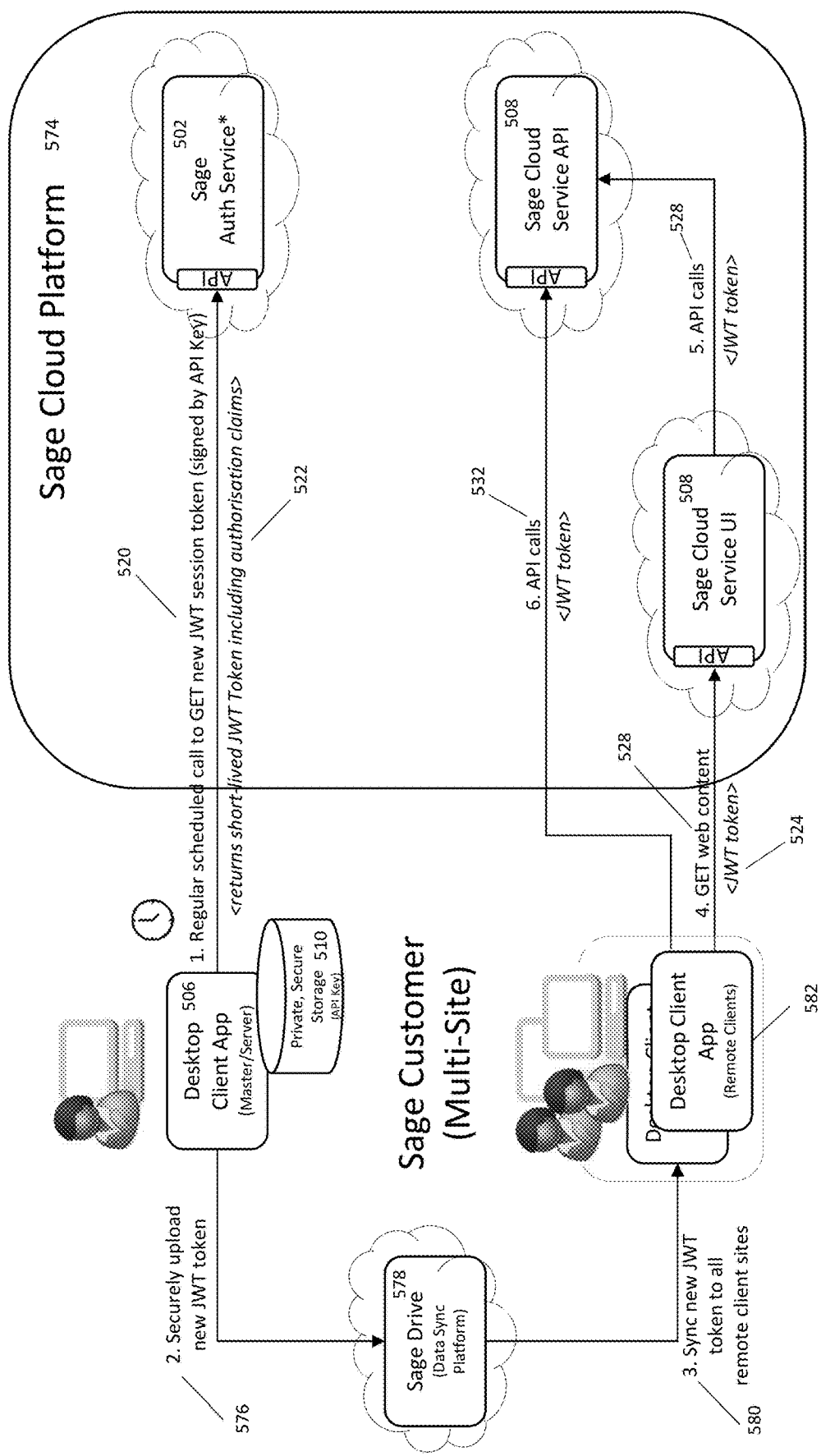
FIG. 5 shows an example system with multiple client devices with data flow according to an embodiment of the invention.

FIG. 5 shows an example system 500 with multiple client devices according to an embodiment of the invention. Elements shown in FIGS. 1, 3 and 4 which are also shown in FIG. 5 have similar reference numerals and will not be discussed in detail again. FIG. 5 shows the application program 506 of a first user with a private secure storage 510 as in FIGS. 1, 3, and 4. FIG. 5 also shows one or more further application programs 582. For example, the user of the application program may be a multi-user group of people, and each user in the group may have an instance of the application program 506, 582 installed for use on their respective client devices.

In some examples, the signed security token may be stored in a cloud-based storage or remote server, so that the signed security token may be synced with remote clients 582. The remote clients 582 may then make API calls to the cloud/remote server 508, and may obtain services/web content from the remote server 508 in the same way as the 'standalone client' 506 which originally connected with the authorisation server 502 to obtain the signed security token 522. The authorisation, to allow a remote client access to use the signed security token and access the remote content, is based upon ownership of a valid signed security token, which can be verified as having been issued by the trusted authorisation server. Due to the secure nature of obtaining a signed security token (which may have a short lifetime, for example, 15 minutes), and the reliable method of sharing these tokens with remote clients, any client who presents such a token may be trusted as an authorised client with trusted access to the authorisation server, or is at least part of a secure network in which one client has trusted access to the authorisation server.

"Step 1. Regular scheduled call to GET new JWT session token (signed by API key)" 520, and "<returns short-lived JWT Token including authorisation claims>" 522 of FIG. 5 are similar to "Step 7." 420, 422 of FIG. 4, in which the application program 506 obtains a signed security token (JWT session token) from the authorisation server 502 ("Sage Auth Service") with which to make a request for access to a remote application feature from the remote server 508.

In this example, the application program 506 is configured to, after receipt of the signed security token 522, store 576 the signed security token in a secure repository 578, which is accessible in this example by the one or more further application programs 582 of the one or more other users. The storage 576 is shown as "Step 2. Securely upload new JWT token".

This secure upload step is based upon an existing secure bi-directional data synchronisation platform, which enables remote clients to become part of a shared private network. The security model allowing for secure upload may, for example, be based on user identity management involving the ongoing use of secure username/password credentials to establish and verify authorised access to the network for both uploading and downloading data.

The system 500 in this example comprises a further client device 582 communicably coupled to the secure repository 578 ("Sage Drive (Data Sync Platform)"). The secure repository 578 is configured to provide the signed security token 580 to the further client device 582 following synchronisation of the further client device 582 with the signed security token stored in the secure repository 578 ("Step 3. Sync new JWT token to all remote client sites" 580). In this way the system 500 allows the further application programs 580 running on the further client device(s) to access the application feature provided by the remote server 508 using the signed security token from the secure repository 578.

Following this secure sharing of the signed security token, the one or more other users may request access to remote application features without being required to request authorisation from the authorisation server 502, because the first application program 506 has performed this step and stored 578 the received signed security token for use by the further application programs 582. The further application programs 582 can then access the remote application features as described in relation to FIG. 4, That is, the further application program can access the application feature provided by the remote server 508 using the signed security token in the step shown as "Step 4. GET web content <JWT token>" 526, wherein the web content is the requested application feature. The further Desktop Client App 582 sends the JWT token 524 obtained from the secure shared storage 578 to the Sage Cloud Service UI 508 of the remote server 508, which provides the requested application feature/web content.

The Sage Cloud Service UI 508 also performs "Step 5. API calls <JWT token>" 528 to communicate from the UI 508 to the Sage Cloud Service API 508 which makes API calls using the JWT token 532 to the further Desktop Client App 582 to manage the communication between the further Desktop Client App 582 and the Sage Cloud Service UI/application feature 508.

Figure 6:
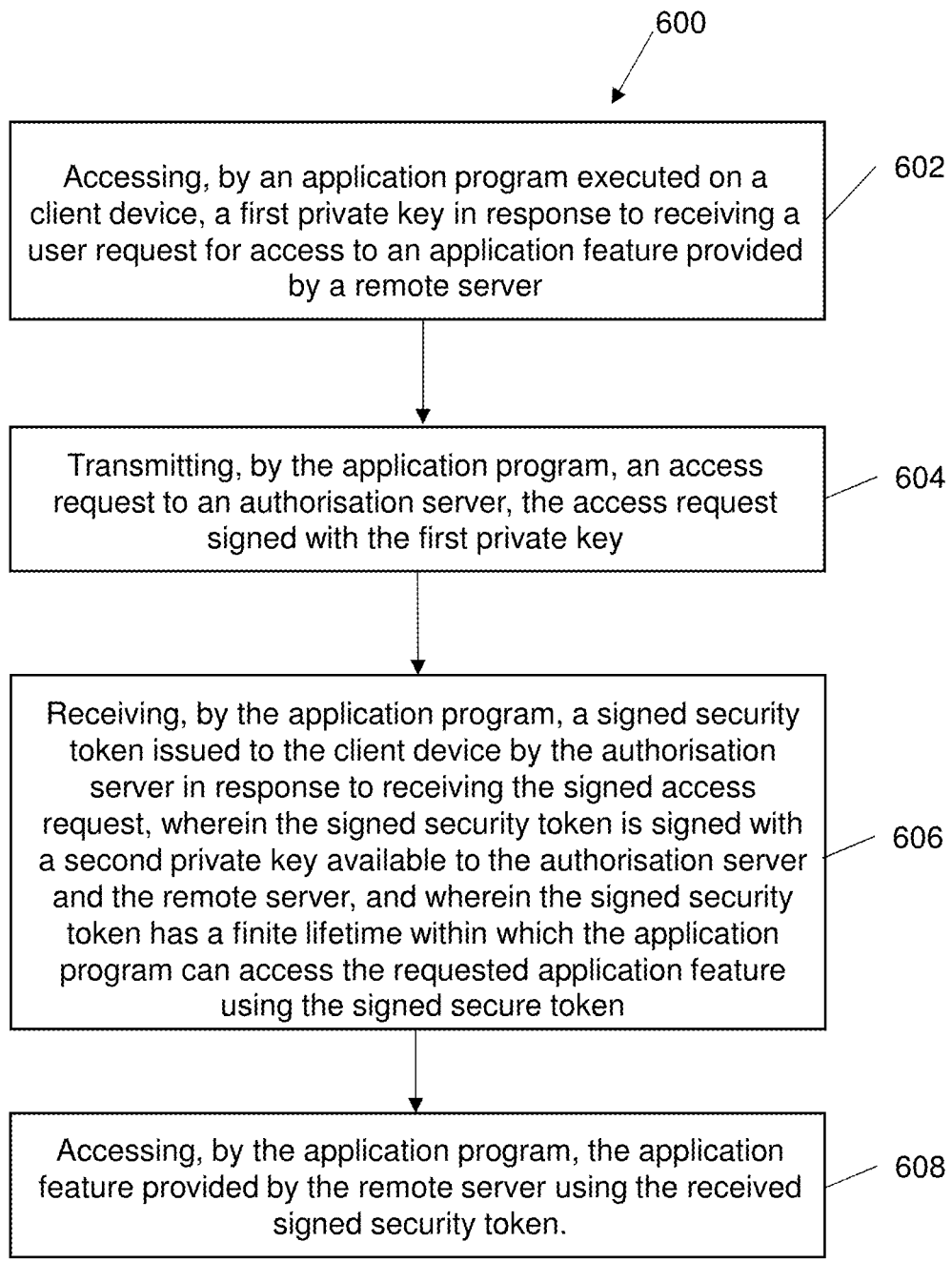
FIG. 6 shows a method according to an embodiment of the invention.

FIG. 6 shows a method 600 according to an embodiment of the invention. The method 600 comprises: accessing, by an application program executed on a client device, a first private key in response to receiving a user request for access to an application feature provided by a remote server 602; transmitting, by the application program, an access request to an authorisation server, the access request signed with the first private key 604; receiving, by the application program, a signed security token issued to the client device by the authorisation server in response to receiving the signed access request, wherein the signed security token is signed with a second private key available to the authorisation server, and wherein the signed security token has a finite lifetime within which the application program can access the requested application feature using the signed security token 606; and accessing, by the application program, the application feature provided by the remote server using the received signed security token 608. The method may be performed by a computer readable medium comprising computer program code which, when executed, is configured to perform the method. Such computer program code may be performed by an application program operating on a client device.

Figure 7:
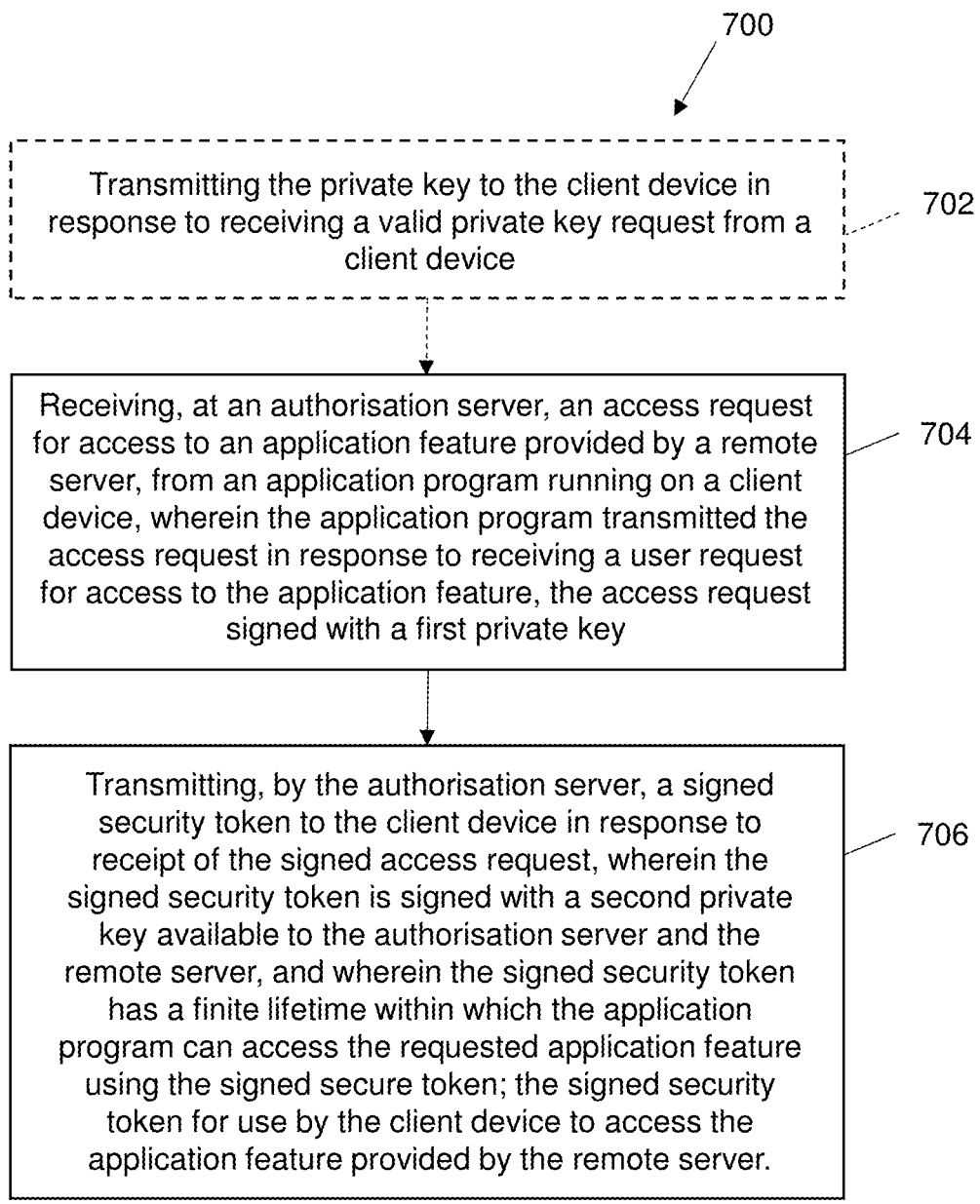
FIG. 7 shows a method according to an embodiment of the invention.

FIG. 7 shows a method 700 according to an embodiment of the invention. The method 700 comprises: receiving, at an authorisation server, an access request for access to an application feature provided by a remote server, from an application program running on a client device, wherein the application program transmitted the access request in response to receiving a user request for access to the application feature, the access request signed with a first private key 704; and transmitting, by the authorisation server, a signed security token to the client device in response to receipt of the signed access request, wherein the signed security token is signed with a second private key available to the authorisation server, and wherein the signed security token has a finite lifetime within which the application program can access the requested application feature using the signed security token; the signed security token for use by the client device to access the application feature provided by the remote server 706.

In some examples the method 700 may further comprise, prior to receiving the access request for access to the application feature provided by the remote server, transmitting the first private key to the client device in response to receiving a valid private key request from a client device 702.

The method 700 may be performed by a computer readable medium comprising computer program code which, when executed, is configured to perform the method 700. Such computer program code may be performed by an authorisation server.

Examples disclosed herein may provide a robust, secure and seamless user transition between a wide range of client applications, including native desktop applications, and a secured, private online web/cloud-based experience. By using different technical authentication mechanisms as described above, e.g. private signing keys and security tokens a secure method of allowing user access to a service or remote program may be achieved (e.g. without relying on the use of a fallible username/password which may be obtained by an unauthorised user). Further, the use of the signed security token (e.g. a JWT session token) 'within' the desktop product to then access remote/cloud services, provides a seamless interface to a user, and allows older desktop products to access newer cloud services in a secure manner.

Examples disclosed herein provide a solution to the problem of secure seamless authentication of wide range of client applications, including native desktop applications to access services and web content from a remote server/cloud. For example, extension programs to a desktop-based application program may be stored at a remote server or cloud, and accessed by an authorised desktop device running the application program. Thus, examples disclosed herein may bridge the gap between desktop software applications and cloud-based software applications.

By replacing the traditional login authentication (with a username and password) with more secure, machine-to-machine, private signing key authentication of security tokens, a system is provided which is transparent to a user, and which provides robust security and a seamless user experience.

Examples disclosed here may provide improved security, because the secure web content obtained from the remote server can only be accessed directly from the user's unique product application instance e.g. a native desktop application (or that of an authenticated associated further product application/desktop instance), and nowhere else, because of authorisation being based on an initial establishment of trust between the user's computer/application (and in some cases the actual user), and the authorisation server.

Because the web authentication mechanism is machine-to-machine (user device to authorisation server), the user is not at risk of somebody compromising their username and password because the user does not need to supply such authorisation credentials each time access to a remote service is required.

The machine-to-machine authentication process is transparent to the end user, and therefore seamless and user friendly.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A system, comprising:
   an authorisation server;
   a client device communicably coupled to the authorisation server, the client device configured to execute thereon an application program; and
   a remote server communicably coupled to the client device for providing an application feature to the application program; wherein:
   the application program is configured to, in response to receiving a user request to use an application feature:
      access a first private key; and
      transmit an access request to the authorisation server, the access request signed with the first private key;
   the authorisation server is configured to:
      issue a signed security token to the application program in response to receiving the signed access request, wherein the signed security token is signed with a second private key available to the authorisation server, and wherein the signed security token has a finite lifetime within which the application program can access the requested application feature using the signed security token;
      periodically transmit a new first private key for storage at a secure storage repository; and
      following transmission of a new first private key:
         prevent issue of a signed security token to the application program in response to receiving a signed access request signed with an old first private key, wherein an old first private key is any first private key transmitted before transmission of the new first private key, and
         issue a signed security token to the application program in response to receiving a signed access request signed with the new first private key; and
   the application program is configured to access the application feature provided by the remote server using the signed security token.

2. The system of claim 1, wherein the application program is configured to access the application feature provided by the remote server by:
   the application program being configured to transmit a service use request with the signed security token to the remote server; and
   the remote server being configured to grant the application program access to the requested application feature following verification of the signed security token by the remote server.

3. The system of claim 1, wherein the signed security token issued to the application program by the authorisation server is one or more of:
   stored securely in-memory of the application program; and
   stored in a web browser session running in the application program.

4. The system of claim 1, wherein the signed security token comprises one or more claims indicating one or more of:
   the requesting user has authorised status to receive a signed security token;
   the requesting user is a member of an organisation which has authorised status to receive a signed security token;
   the identity of the application program;
   the identity of the authorisation server issuing the signed security token;
   the IP address of the client device;
   an expiration time of the signed security token;
   a timeframe within which the signed security token may be used to access an application feature provided by the remote server and outside which the signed security token may not be used to access an application feature provided by the remote server;
   a timestamp indicating the time of issuance of the signed security token by the authorisation server;
   a signed security token signature which can be validated against the public key of the authorisation server; and
   a unique identifier of the signed security token.

5. The system of claim 1, wherein the application program is configured to, in response to receiving a timeout indication indicating an expiry time of the signed security token:
   re-access the first private key, and
   transmit a further access request signed with the first private key to the authorisation server requesting re-issuance of a signed security token to the application program.

6. The system of claim 1, wherein the application program is configured to, after receipt of the signed security token, store the signed security token in a secure repository.

7. The system of claim 6, wherein the system comprises a further client device communicably coupled to the secure repository, the secure repository configured to:
   provide the signed security token to the further client device following synchronisation of the further client device with the signed security token stored in the secure repository, thereby allowing the further client device to access the application feature provided by the remote server using the signed security token.

8. The system of claim 1, wherein the first private key is stored at a secure storage repository communicably coupled to the client device, and wherein the application program is configured to access the first private key from the secure storage repository.

9. The system of claim 8, wherein:
the application program is configured to transmit an application program registration request to the authorisation server;
the authorisation server is configured to verify the application program registration request as a valid request; and transmit a registration security token to the application program in response to verification of the valid application program registration request;
the application program is configured to transmit the received registration security token with an authorised application program registration request to register the application program with the authorisation server to the authorisation server; and
the authorisation server is configured to transmit the first private key for secure storage at the secure storage repository in response to receipt of the registration security token and the authorised application program request from the application program.

10. The system of claim 9, wherein the application program registration request comprises one or more of:
a unique user identifier indicating the user is authorised to use the application program to subsequently obtain the application feature; and
a unique application program identifier indicating the application program to be used to subsequently obtain the application feature.

11. The system of claim 1, wherein the application program comprises one or more local application features available at the client device, wherein the application program is configured to, in response to receiving a user request to use a local application feature, provide the local application feature to the user from the client device.

12. The system of claim 1, wherein one or more of the authorisation server and the remote server are comprised in a computing cloud.

13. The system of claim 1, wherein the security token is a JavaScript Object Notation Web Token.

14. The system of claim 1, wherein one or more of the first private key and the second private key is an Application Programming Interface key.

15. The system of claim 1, wherein the client device is one or more of: a desktop computer, a laptop computer, a tablet computer, a portable electronic device, a mobile telephone, a smartwatch, a computing device in a vehicle, or a module for the same.

16. A client device comprising:
at least one processor; and
at least one computer-readable storage medium having encoded thereon executable instructions that, when executed by the at least one processor, cause the at least one processor to execute an application program to perform a method comprising:
in response to receiving a user request for access to an application feature provided by a remote server:
accessing a first private key;
transmitting an access request to an authorisation server, the access request signed with the first private key;
receiving a signed security token issued to the client device by the authorisation server in response to receipt of the signed access request by the authorisation server, wherein the signed security token is signed with a second private key available to the authorisation server, and wherein the signed security token has a finite lifetime within which the application program can access the requested application feature using the signed security token;
receiving a signed security token issued to the client device by the authorisation server in response to receiving a new signed access request signed with a new first private key, wherein the new first private key is periodically transmitted by the authorisation server for storage at a secure storage repository, and wherein, following transmission of a new first private key, issuance of a signed security token to the application program is prevented by the authorisation server in response to the authorisation server receiving a signed access request signed with an old first private key, wherein an old first private key is any first private key transmitted before transmission of the new first private key; and
accessing the application feature provided by the remote server using the received signed security token.

17. An authorisation server comprising:
at least one processor; and
at least one computer-readable storage medium having encoded thereon executable instructions that, when executed by the at least one processor, cause the at least one processor to perform m 1 comprising:
receiving an access request for access to an application feature provided by a remote server, from an application program running on a client device, wherein the application program transmitted the access request in response to receiving a user request for access to the application feature, the access request signed with a first private key; and
transmitting a signed security token to the client device in response to receipt of the signed access request, wherein the signed security token is signed with a second private key available to the authorisation server, and wherein the signed security token has a finite lifetime within which the application program can access the requested application feature using the signed security token; the signed security token for use by the client device to access the application feature provided by the remote server;
periodically transmitting a new first private key for storage at a secure storage repository; and,
following transmission of a new first private key:
preventing issue of a signed security token to the application program in response to receiving a signed access request signed with an old first private key, wherein an old first private key is any first private key transmitted before transmission of the new first private key, and
issuing a signed security token to the application program in response to receiving a signed access request signed with the new first private key.

18. The authorisation server of claim 17, wherein the method further comprises:
prior to receiving the access request for access to the application feature provided by the remote server, and in response to receiving a valid private key request from a client device, transmitting the first private key to the client device.

* * * * *